United States Patent [19]

Froberg et al.

[11] Patent Number: 5,625,722
[45] Date of Patent: Apr. 29, 1997

[54] METHOD AND APPARATUS FOR GENERATING DATA ENCODED PULSES IN RETURN-TO-ZERO FORMAT

[75] Inventors: Nan M. Froberg, Lowell, Mass.; Alan H. Gnauck, Middletown, N.J.; Gregory Raybon, Leonardo, N.J.; John J. Veselka, Freehold, N.J.

[73] Assignee: Lucent Technologies Inc., Murray Hill, N.J.

[21] Appl. No.: 360,893

[22] Filed: Dec. 21, 1994

[51] Int. Cl.$^6$ ..................................................... G02B 6/10
[52] U.S. Cl. .................. 385/1; 359/181; 359/184; 341/68; 341/69
[58] Field of Search ...................... 356/345, 358, 356/383; 385/24, 3, 4, 8; 359/181, 184, 185, 186, 154, 158, 183; 341/68, 69; 360/41

[56] References Cited

U.S. PATENT DOCUMENTS

| | | | |
|---|---|---|---|
| 4,753,529 | 6/1988 | Layton | 356/345 |
| 4,791,407 | 12/1988 | Prucnal et al. | 341/68 |
| 4,805,235 | 2/1989 | Henmi | 455/608 |
| 5,220,582 | 6/1993 | Kakaru et al. | 341/70 |
| 5,222,105 | 6/1993 | Kinney et al. | 341/70 |
| 5,305,079 | 4/1994 | Gnauck et al. | 385/8 |
| 5,339,185 | 8/1994 | Laede | 341/68 |

FOREIGN PATENT DOCUMENTS

| | | | |
|---|---|---|---|
| 3204839 | 9/1993 | Germany | H03F 3/08 |
| 4212934A1 | 10/1993 | Germany | H04B 10/06 |

OTHER PUBLICATIONS

Couch, II, L.W., *Digital and Analog Communication Systems*, MacMillan Publishing Co., New York, N.Y., Second Edition, 1987, pp. 138–141.

Haus, H.A., et al., "Picosecond Optical Sampling," IEEE Journal of Quantum Electronics, vol. QE–16, No. 8, Aug. 1980, pp. 870–873.

Korotky, S.K., et al., "High-speed, Low Power Optical Modulator with Adjustable Chirp Parameter," Tech. Digest Integrated Photonics Research, Monterey, CA, 1991, paper TuG2 pp. 53–54.

Marcatili, E.A.J., "Optical Subpicosecond Gate," Applied Optics, vol. 19, No. 9, May 1, 1980, pp. 1468–1476.

Suzuki, M. et al., "Transform–limited 14 ps Optical Pulse Generation with 15 GHz Repetition Rate by InGaAsP Electroabsorption Modulator," Electronics Letters, vol. 28, No. 11, May 21, 1992, pp. 1007–1008.

Tucker, R.S., et al., "16 Gbit/s Fibre Transmission Experiment Using Optical Time–Division Multiplexing," Electronics Letters, vol. 23, No. 24, Nov. 19, 1987, pp. 1270–1271.

Veselka, J.J., and Korotky, S.K., "Optical Soliton Generator Based on a Single Mach–Zehnder Modulator," Integrated Photonics Research, 1994 Technical Digest Series, vol. 3, (Optical Society of America, Washington, D.C., 1994), pp. 190–192.

Electronique, No. 19, Jun. 1992, France, pp. 68–72.

International Conference on Industrial Electronics, Control and Instrumentation, 28 Oct. 28 1991 — 1 Nov. 1991, Japan, pp. 2574–2579.

*Primary Examiner*—John Ngo

[57] ABSTRACT

A method and apparatus for converting a non-return-to-zero (NRZ) voltage data stream into an optical data stream in return-to-zero (RZ) format, is disclosed comprising supplying a continuous optical signal to a modulator, driving the modulator with an NRZ voltage data stream and encoding either the NRZ data stream or the electrical output of the receiver. The modulator can be an interferometer, such as a Mach-Zehnder interferometer, or a directional coupler, for example.

42 Claims, 5 Drawing Sheets

METHOD AND APPARATUS FOR GENERATING DATA ENCODED PULSES IN RETURN-TO-ZERO FORMAT

FIELD OF THE INVENTION

The present invention relates to a method and apparatus for generating data encoded pulses and, more particularly, an apparatus and method for converting a non-return-to-zero (NRZ) voltage data stream into an optical data stream in return-to-zero (RZ) format.

BACKGROUND OF THE INVENTION

Optical communication systems that use a return-to-zero (RZ) data format need simple sources of data-encoded pulses. Such systems include those where the data is transmitted long distances in the form of soliton pulses and optically time-division multiplexed systems where the data must be encoded in the RZ format before multiplexing.

RZ transmitters are more complex than their non-return-to-zero (NRZ) counterparts. The most commonly used transmitters in experimental RZ systems include a mode-locked or gain switched laser followed by a modulator. See, for example, "16 G-bits/s Fibre Transmission Experiment Using Optical Time Division Multiplexing," R. S. Tucker, et. al., Electronics Letters," Vol. 23, No. 24, Nov. 19, 1987, pp. 1270–1271, incorporated by reference, herein. The lasers generate optical pulses and the modulator gates the pulses to encode the data. The mode-locked lasers must have the precise cavity length to obtain the desired pulse repetition rate and often require high RF power. The gain switched laser generates pulses with a broad spectrum, which broaden in time when transmitted through a fiber. A filter can be provided to reduce the spectrum, but that decreases the power of the pulses. Other transmitters use electroabsorption or interferometric modulators to generate the pulses followed by another modulator to encode the data.

There have been several proposals and demonstrations of optical pulse generation using interferometric, directional coupler and electroabsorption modulators. See, for example, H. A. Haus, S. T. Kirsch, K. Mathyssek and F. J. Leonberger, "Picosecond optical sampling," IEEE Journal of Quantum Electronics, vol. QE-16, no. 8, pp. 870–874, 1980; J. J. Veselka and S. K. Korotky, "Optical soliton generator based on a single Mach-Zehnder modulator," Integrated Photonics Research, 1994 Technical Digest Series, Vol. 3 (Optical Society of America, Washington, D.C., 1994), pp. 190–192; and E. A. J. Marcatilli, "Optical subpicosecond gate," Applied Optics, vol. 19, no. 9 pp. 1468–1476, 1980; and Suzuki, H. Tanaka, K. Utaka, N. Edagawa, and Y. Matsushima, "Transform-limited 14 ps optical pulse generation with 15 GHz repetition rate by InGaAsP electroabsorption modulator," Electron. Lett., vol. 28, no. 11, pp. 1007–1008, 1992, all of which are incorporated by reference herein. These references do not teach encoding data.

SUMMARY OF THE INVENTION

In accordance with one aspect of the present invention, a modulator, such as an interferometer or directional coupler, is used to simultaneously generate pulses and encode data when driven by an NRZ voltage.

In one embodiment of the invention, a method of converting a non-return-to-zero (NRZ) voltage data stream into a return-to-zero (RZ) optical data stream is disclosed. This method may comprise the steps of supplying a continuous optical signal to a modulator which has a minimum optical output at a first voltage driving level, a minimum optical output at a second voltage level, and a maximum optical output at a voltage level between the first and second voltage levels. The NRZ data stream to be converted into the RZ optical signal is then encoded, preferably by differential encoding. The modulator is driven by the encoded NRZ voltage data stream to generate an RZ optical data stream such that there will be an optical pulse when the voltage data stream transitions from the first to the second or from the second to the first voltage levels. Alternatively, the modulator can be driven by the NRZ voltage data stream and the signal can be encoded after reception. The modulator is preferably an interferometer, such as a Mach-Zehnder interferometer, or a directional coupler.

In another embodiment of the invention, an apparatus for converting a non-return-to-zero (NRZ) voltage data stream into a return-to-zero (RZ) optical data stream is disclosed. This apparatus may suitably comprise a source of a continuous optical signal and a modulator having an input for receiving the optical signal and an output. The modulator has a minimum optical output at a first voltage driving level, a minimum optical output at a second voltage driving level, and a maximum optical output at a voltage level between the first and second voltage levels. A source of an NRZ voltage data stream provides the NRZ data stream to an encoder, which has an input for receiving the NRZ data stream and an output for supplying an encoded NRZ data stream to the modulator. The encoded NRZ data stream drives the modulator such that there will be a maximum optical output when the voltage data stream transitions from the first to the second or from the second to a first voltage level, generating an RZ optical output. Alternatively, the NRZ data stream directly drives the modulator and an encoder encodes the signal after reception. The modulator is preferably an interferometer such as a Mach-Zehnder interferometer, or a directional coupler.

The features discussed above, as well as additional features and advantages of the present invention, will become apparent by reference to the following detailed description and accompanying drawings.

DESCRIPTION OF THE DRAWINGS

FIGS. 8A–8F show an exemplary voltage data stream, encoded driving voltage, optical data stream, and their corresponding digital representations, for the embodiment of FIG. 1; and FIGS. 9A–9F show an exemplary voltage data stream, optical data stream, encoded data stream and their corresponding digital representations, for the embodiment of FIG. 2.

DETAILED DESCRIPTION OF THE INVENTION

Figure 1:
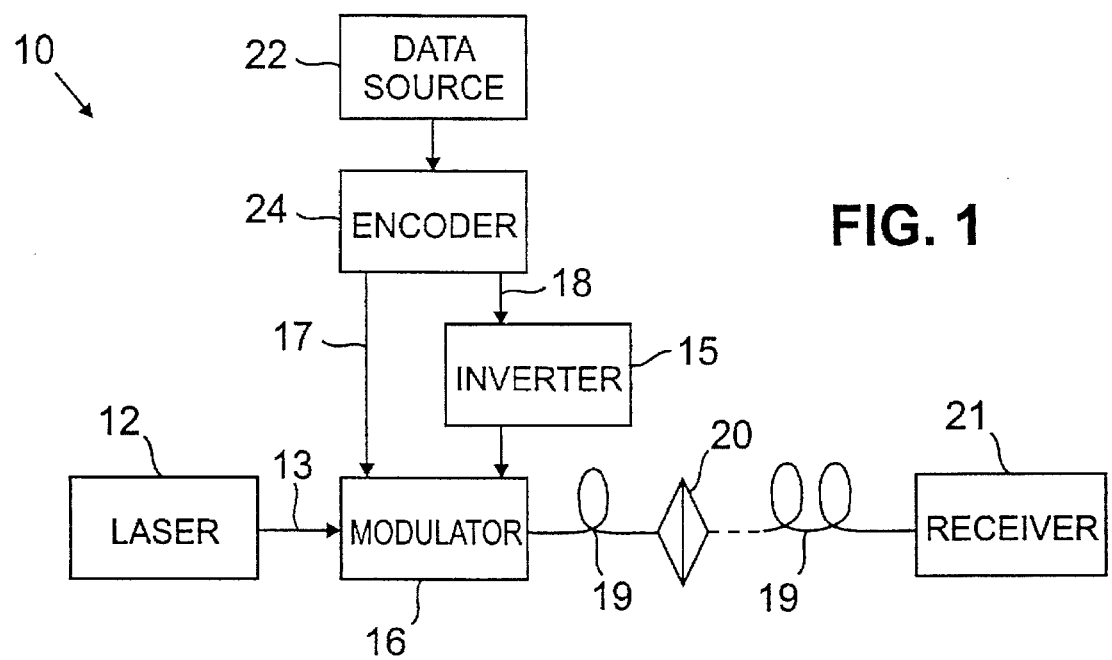
FIG. 1 is a lightwave transmission system in accordance with one embodiment of the present invention.

FIG. 1 is a block diagram of one embodiment of a lightwave transmission system 10 for converting voltage signals in non-return-to-zero (NRZ) format into optical signals in return-to-zero (RZ) format, in accordance with the present invention. The system includes a laser 12, a modulator 16, a data source 22, an encoder 24 and a receiver 21. The laser provides light to the modulator 16. The data source 22 provides a voltage data stream in NRZ format which is to be converted into RZ optical signals. The NRZ voltage data stream is provided to an encoder 24, which encodes the data stream and drives the modulator 16 with the encoded NRZ version of the NRZ data stream. The encoder 24 is preferably a differential encoder, as discussed further below.

Two output leads 17 and 18 are preferably provided to drive the modulator. An inverter 15 may be preferably provided along one of the leads, lead 18, for example, dependent on the type of modulator used, as discussed further, below. The use of two leads 17 and 18 and the inverter instead of one lead allows lower voltage operation and produces zero chirp transform limited optical signals as discussed below and in U.S. Pat. No. 5,303,079 ('079 patent), which is incorporated by reference, herein. The output of the modulator 16 consists of optical signals in RZ format, which are transmitted along lengths of optical fiber 19 spanning the distance to the receiver 21.

Figure 2:
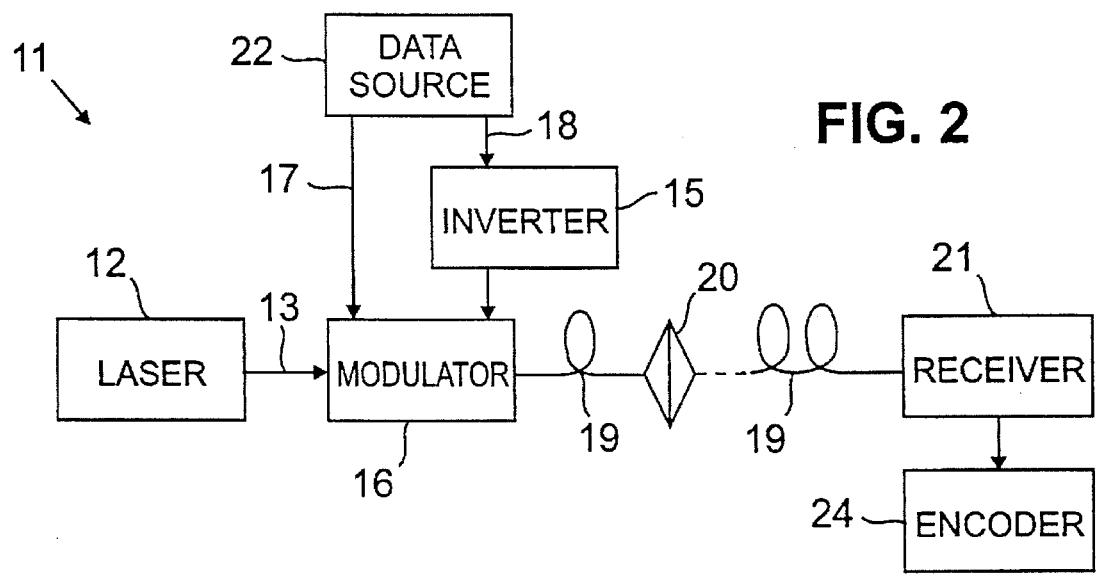
FIG. 2 is a lightwave transmission system in accordance with a second embodiment of the present invention.

In a second embodiment 11 of the invention, shown in FIG. 2, the encoder 24 can be provided downstream of the receiver 21, to encode the received data stream. It can also be part of the receiver 21, itself. In this embodiment, the NRZ data source 22 directly drives the modulator 16, preferably via output leads 17 and 18. As above, an inverter 15 is preferably provided on lead 18, for example. All other aspects of the system are the same as in FIG. 1.

In the embodiments of FIGS. 1 and 2, the laser 12 operates in a continuous wave (CW) mode to produce light at a predetermined, tunable transmission wavelength for the lightwave transmission system. For long-wavelength systems, the laser 12 is typically an InGaAsP/InP semiconductor single mode laser operating nominally at 1.55 µm, for example. An output optical beam from the laser 12 is typically coupled into the optical fiber 13, which is referred to as a fiber pigtail.

An isolator (not shown) may be provided between the laser and the modulator 16 to reduce reflections toward the laser from the rest of transmission system. The isolator can be positioned between the optical fiber 13 and the modulator 16 as an in-line element or can be mounted between the laser 12 and fiber 13.

The transmission medium can include one or a plurality of lengths of optical fiber 19. Optical amplifiers 20, such as erbium doped optical fiber amplifiers, may be provided to amplify the modulated light as it propagates along the lengths of optical fiber 19. The optical fiber 19 is preferably either a standard silica-based fiber having a dispersion minimum in the vicinity of 1.3 µm or a dispersion shifted fiber having its dispersion minimum in the vicinity of 1.55 µm. The transmission medium is of sufficient length to span the distance from the transmitter to lightwave receiver 21.

The receiver 21 is a lightwave receiver which comprises a photodetector which converts the optical pulses into electrical signals. In the embodiment of FIG. 2, the receiver 21 may include the encoder 24.

Appropriate lasers, data sources, encoders, inverters, modulators, optical fibers, optical amplifiers, and lightwave receivers are commercially available and well known to persons skilled in the art.

The modulator 16 is of a type which has a minimum optical output at a first voltage driving level, a minimum optical output at a second voltage level, and a peak optical output at a voltage level between the first and second voltage levels. The modulator 16 will therefore generate an optical output when the voltage data stream transitions from the first to the second voltage level or from the second to the first level. The first voltage level can correspond to a low voltage or a "0" in the data stream while the second voltage level can correspond to a high voltage or a "1" in the data stream, for example. A transition from a low voltage to a high voltage (0 to 1) or a high voltage to a low voltage (1 to 0) will cause the generation of a clearly defined optical pulse. Interferometers, such as a Mach-Zehnder interferometer ("MZI"), or directional couplers, for example, are appropriate modulators for use in the present invention. Other types of modulators, with the appropriate transfer characteristic (a minimum voltage output at a first and second driving voltage, with a maximum output at a voltage between the first and second driving voltages), can also be used.

Figure 3:
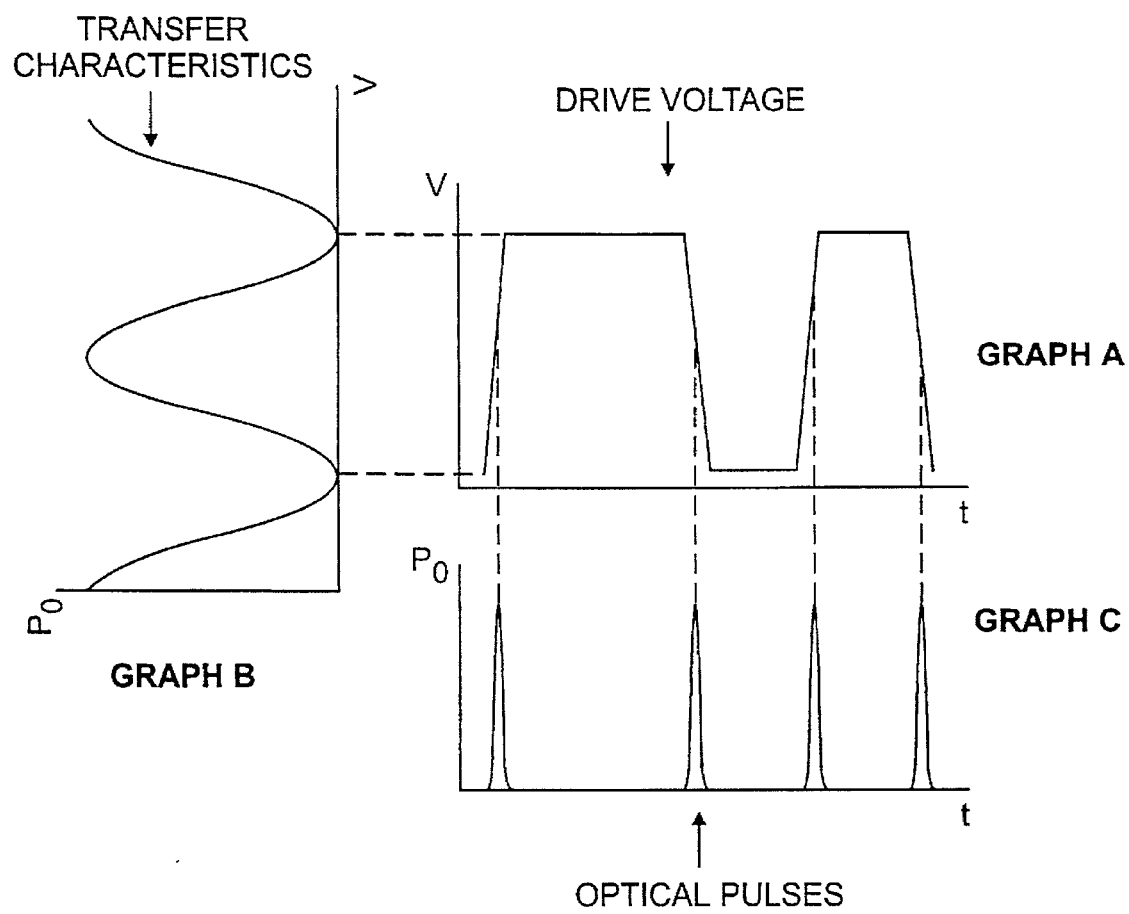
FIG. 3 shows graphs of a typical driving voltage in NRZ format in Graph A, a transfer characteristic for a modulator in Graph B, and in Graph C, the optical pulses output in RZ format by the modulator of Graph B when driven by the voltage of Graph A.

The relation between the driving voltage, the transfer characteristic of the modulator 16 and the optical pulses generated by the modulator 16, for a MZI interferometer, are shown in FIG. 3. Graph A of FIG. 3 shows a drive voltage in NRZ format on a graph of voltage (V) versus time (t). Graph B shows the transfer characteristic function of the modulator 16 on a graph of optical power (Po) versus voltage (V), oriented so that two adjacent optical power minima of the transfer characteristic in Graph B correspond to the high and low voltage levels Graph A. Graph C shows the corresponding optical pulse output of the modulator 16 in RZ format on a graph of optical power (Po) versus time (t). A transition from a low voltage to a high voltage or a high voltage to a low voltage in the drive voltage of Graph A sweeps the optical power output shown in Graph B between adjacent minimum optical power levels, through a maximum power level, generating an optical pulse.

Figure 4:
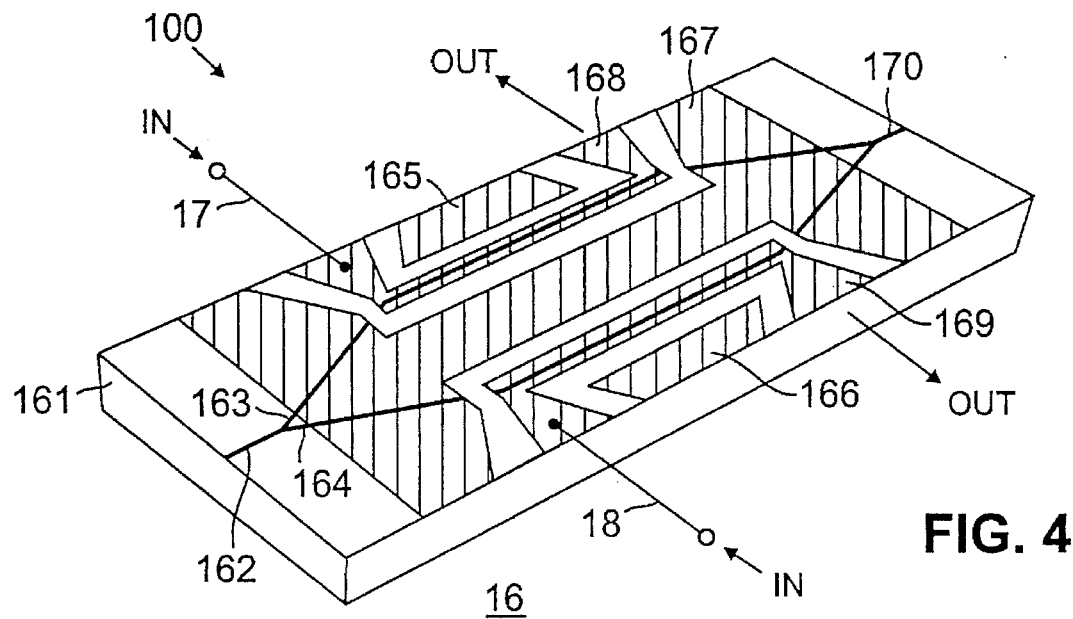
FIG. 4 is a perspective view of a preferred Mach-Zehnder interferometer for use in the present invention.

A presently preferred MZI modulator 100 is shown in FIG. 4 and described in the '079 patent. This MZI 100 comprises titanium in-diffused waveguides 162, 163, 164, and 170 on a lithium niobate substrate 161. Ground planes 165, 166, and 167 are disposed to maintain electrical isolation between drive electrodes 168 and 169 and to insure that the drive electrodes independently control their respective waveguides. As a result, the waveguides 163 and 164 are individually addressable via the drive electrodes 168 and 169, respectively. The drive electrodes are of the travelling-wave or lumped-element types. The drive electrode 168 is connected to the lead 17 and disposed over a portion of the waveguide 163. Similarly, the drive electrode 169 is connected to the lead 18 and is disposed over a portion of waveguide 164.

An input Y-branch couples the optical signal in the waveguide 162 into both waveguides 163 and 164 while an output Y-branch couples the optical signals from the coplanar strip waveguides 163 and 164 into a single waveguide 170. Instead of the Y-branch splitter, other apparatus such as a beam splitter or a directional coupler can be used. The path lengths in both waveguides 163, 164 are preferably the same. Further details concerning the design and fabrication of the MZI 100, and alternative embodiments of the MZI 100, can be found in the '079 patent.

During operation in accordance with the present invention, the laser beam entering the MZI 100 along the waveguide 162 is split into the waveguides 163, 164 and is recombined in the waveguide 170. Since the two path lengths are the same, if no potential is applied to the drive electrodes 168 and 169, then, the two split optical beams will be in phase when they recombine. There is constructive interference and an intensity peak in the output optical beam. Constructive interference and a resulting maximum output typically corresponds to a "1" in an optical data stream.

When a potential is applied to one or both of the drive electrodes 168, 169, the indices of refraction of portions of the effected waveguides 163, 164 are changed, introducing a phase shift by changing the velocity of one or both beams. A phase shift of 180° between both beams will cause destructive interference in the output beam, yielding a minimum or no output. Destructive interference and no output typically corresponds to "0" in an optical data stream.

Preferably, both waveguides 163, 164 are separately controlled to yield the resulting 180° phase shift. The phase of one split beam is therefore preferably increased 90° while the phase of the other is preferably decreased 90°. The inverter 15 is preferably provided so that the output leads 17, 18 of the encoder 24, will drive each waveguide 163, 164, to an equal and opposite degree. Alternatively, the phase of one beam can be shifted the full 180°, but this can introduce phase modulation causing frequency chirp in the output.

To convert a non-return-to-zero (NRZ) voltage into RZ optical pulses in accordance with the present invention, the MZI 16 is preferably biased such that a "0" or low voltage level and a "1" or high voltage level will cause destructive interference between the optical signals, yielding a "0" output. A voltage level, suitably selected between the high and low, yields constructive interference and generation of an output of "1." The voltage level yielding the constructive interference is preferably at a level approximately halfway between the high and low voltage levels. As shown in Graphs A and B of FIG. 3, the low or high voltage levels correspond to the minimum optical power of the characteristic of the MZI 100. Shifting from a low (0) to a high (1) or from a high (1) to a low (0) moves the state of the modulator from a minimum, through the peak in optical power, to an adjacent minimum, generating an optical pulse corresponding to a 1 in the optical-data stream, as shown in Graph C.

Figure 5:
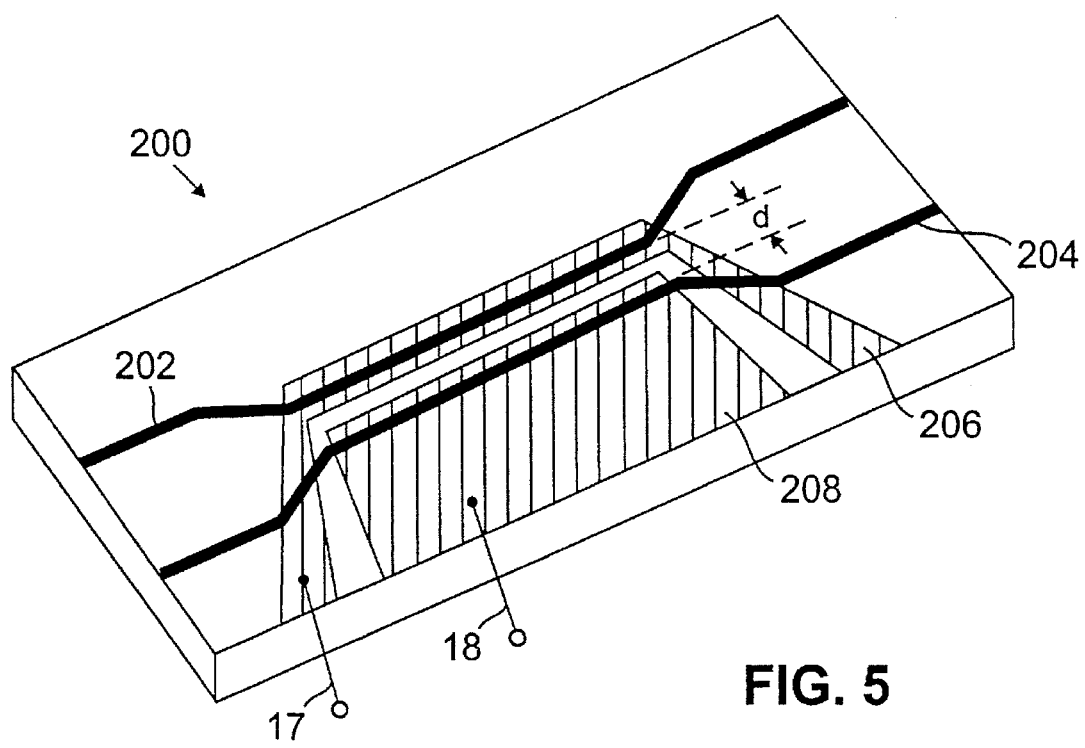
FIG. 5 is a simplified representation of a directional coupler for use in the present invention.

The modulator 16 can also be a directional coupler 200, as shown in FIG. 5. As is known in the art, a directional coupler comprises two wave guides 202, 204, of electrooptic material, aligned side-by-side. The waveguides are preferably spaced apart by a distance "d" of approximately 4–8 microns. Drive electrodes 206, 208 are connected to the leads 17 and 18, respectively. Voltages supplied on leads 17 and 18 vary the index of refraction of each waveguide. If the waveguides have the same index of refraction, essentially all the light from one waveguide will couple into the second waveguide. If the index of refraction of the waveguides are different, some or all of the light will not couple into the second waveguide. When used in the embodiments of FIGS. 1 and 2, the input of the waveguide 204 would be coupled to the laser 12 while the output of the waveguide 202 would be coupled to the optical fibers 19. If desired, an inverter may be provided, as shown in FIG. 1, along leads 17 or 18 to drive each waveguide 206, 208 in an equal and opposite degree.

Figure 6:
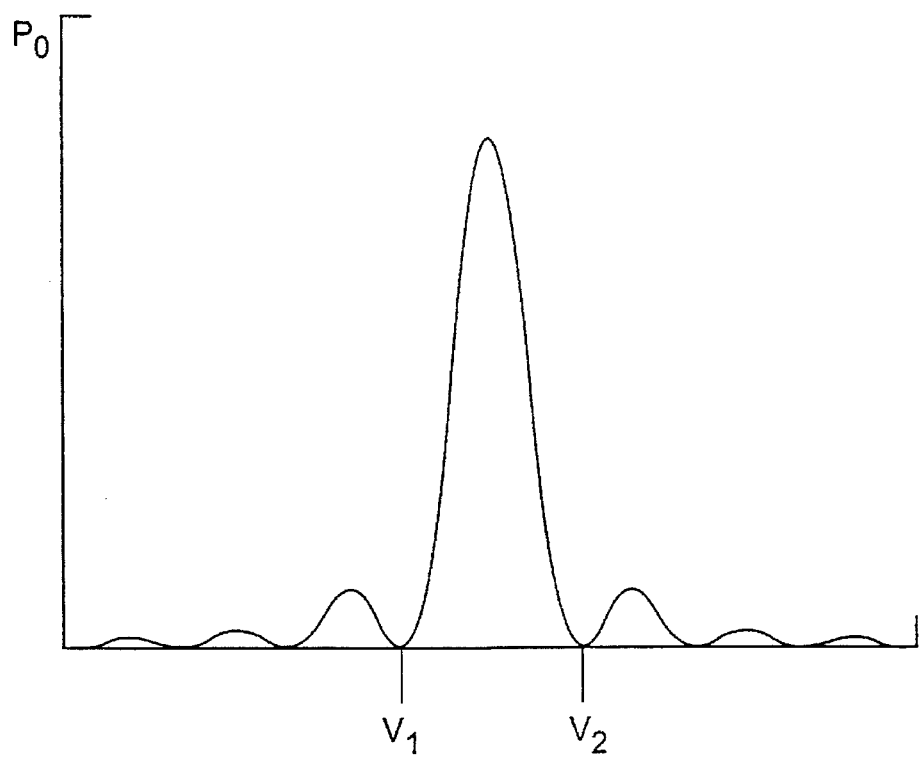
FIG. 6 is a graph of voltage (V) versus power output (Po) for a directional coupler such as that of FIG. 5, for example.

A typical transfer characteristic for a directional coupler is shown in FIG. 6, and is of the form $(\sin\sqrt{a+bV^2}/\sqrt{a+bV^2})^2$, where a and b are constants, as is known in the art. As in the MZI 100, above, two voltages, such as $V_1$ and $V_2$, can be chosen which correspond to adjacent minima in the voltage (V) vs. optical power output (Po) transfer characteristic, and minimum light output. FIG. 6 shows that a transition from $V_1$ to $V_2$ (or vice versa), passes through a peak in optical power output, generating an optical pulse. As above, the voltages supplied by the leads 17, 18 can be arranged such that when a low voltage level and a high voltage level drive the electrooptic waveguides 202, 204, passage of light from the waveguide 202 to the waveguide 204 is prevented, while during transitions from low to high or high to low voltage levels, the index of refractions of both waveguides will match, allowing light to pass and generating an optical pulse. The directional coupler 200 can be made of lithium niobate, lithium tantalate or other electrooptic semiconductor materials.

Figure 7:
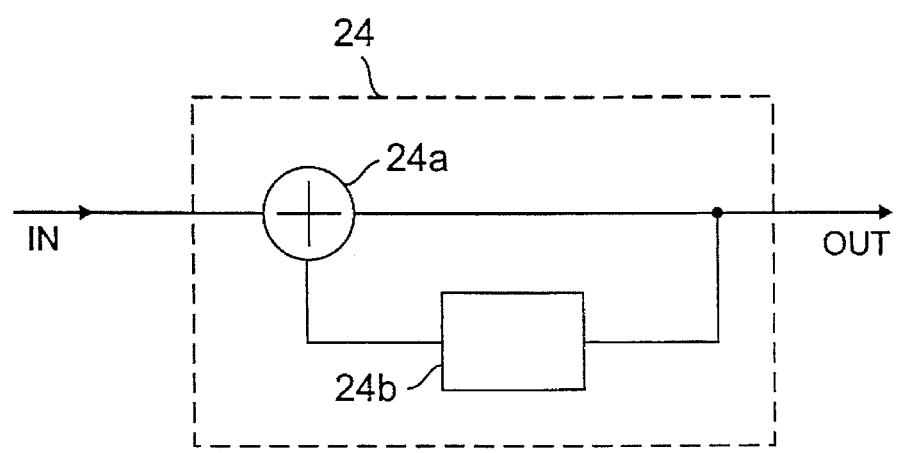
FIG. 7 is a schematic diagram of a differential encoder for use in the embodiments of FIGS. 1 and 2.

As mentioned above, the encoder 24 of FIGS. 1 and 2 is preferably a differential encoder. In differential encoding, the nth bit of the encoder output is derived by adding, modulo 2, the n-1 bit of the encoder output to the nth bit of the data stream. The modulo 2 adder can be provided by an exclusive OR gate, as is known in the art. FIG. 7 is a block diagram of an example of a differential encoder 24, using an exclusive OR gate 24a and a 1 bit delay 24b. Differential encoding is described in *Digital and Analog Communication Systems* by L. W. Couch II, MacMillan Publishing Co., New York, N.Y., pp. 138–140, Second Edition, 1987, incorporated by reference herein.

In the embodiment of FIG. 1, with the differential encoder 24 of FIG. 7, the modulator 16 is driven by an NRZ voltage which is a differentially encoded version of the NRZ data stream. The modulator 16 acts as a decoder, producing an optical RZ version of the data stream corresponding to the original NRZ data stream. The optical data stream is transmitted along the lengths of optical fiber 19, to the receiver 21, which converts the optical signals into electrical signals. In the embodiment of FIG. 2, the modulator 16 is driven directly by the NRZ voltage data stream. The optical signals output by the modulator in RZ format are transmitted along the lengths of optical fiber 19, to the receiver 21. The receiver 21 converts the optical signals output by the modulator to electrical signals, which are then differentially encoded to retrieve the original NRZ data stream.

Typically, the receiver 21 converts the optical signals into an NRZ voltage data stream. FIGS. 8A–F and 9A–F illustrate the encoding and modulation of a data stream in accordance with the embodiments of FIGS. 1 and 2, with an encoder as shown in FIG. 7.

Figure 8A:
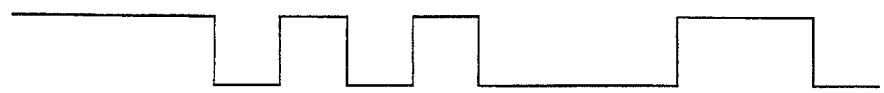
Figure 8D:
Figure 8E:
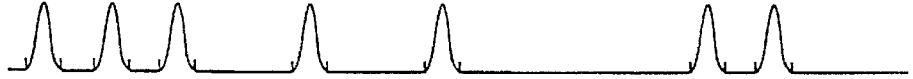

FIG. 8A shows an exemplary NRZ voltage data stream generated by the data source 22. FIG. 8B shows the data stream of Line A, in digital format. In the embodiment of FIG. 1, the data stream of FIG. 8A is provided to the encoder 24, which differentially encodes the data stream. FIG. 8C shows a differentially encoded version of the digital data stream of FIG. 8B, in digital format. FIG. 8D shows the NRZ voltage data stream corresponding to FIG. 8C, which drives the modulator 16. FIG. 8E shows the resulting optical pulses in RZ format of the output of the modulator 16, where the modulator 16 operates as described above. FIG. 8F shows a digital representation of the RZ optical data stream of FIG. 8E, which is identical to the digital representation of the initial NRZ data stream in FIG. 8B.

Figure 9A:
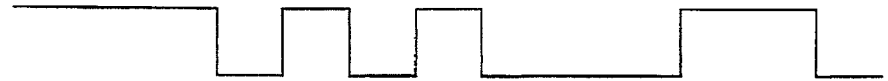
Figure 9C:
Figure 9E:
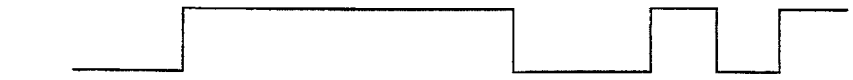

In the embodiment of FIG. 2, the output of the data source 22 directly drives the modulator 16 and the optical data stream is differentially encoded after reception. In FIG. 9A, the same NRZ voltage data stream of FIG. 8A is provided by data source 22. Its digital representation is shown in FIG. 9B. The NRZ voltage data stream of FIG. 9A drives the modulator 16, generating the optical pulses in RZ format, shown in FIG. 9C. FIG. 9D shows a digital representation of the optical data stream of FIG. 9C. The optical data stream of Line C is converted into electrical signals by the receiver 21. FIG. 9E shows the NRZ voltage output of the receiver 21, which is provided to the differential encoder 24. FIG. 9F shows a differentially encoded version of the data stream of Line D in digital format, which is identical to the data stream of Line B.

Typically, the optical pulse width, Full Width at Half Maximum (FWHM), is less than half the time to transition from the low voltage to the high. For the NRZ drive signal, the optical pulses can be very narrow, for example, less than one tenth of the bit period, if the NRZ transitions are very fast and the modulator bandwidth is appropriately large. The optical pulses can be broadened by low pass filtering the NRZ drive signal to slow the transitions.

The above described embodiments of the invention are merely illustrative. Other arrangements may be devised by those skilled in the art which will embody the principles of the invention and fall with the spirit and scope of the invention as defined in the claims, below.

We claim:

1. A method of converting a non-return-to-zero (NRZ) voltage data stream into a return-to-zero (RZ) optical data stream comprising:

supplying a continuous optical signal to a modulator, wherein the modulator has a minimum optical output at a first voltage driving level, a minimum optical output at a second voltage level, and a maximum optical output at a voltage level between the first and second voltage levels;

encoding an NRZ voltage data stream; and driving the modulator with the encoded NRZ voltage data stream to generate an RZ optical data stream such that there will be a maximum optical output when the encoded NRZ voltage data stream transitions from the first to the second or from the second to the first voltage level.

2. The method of claim 1, wherein the encoding step comprises differential encoding.

3. The method of claim 1, wherein the modulator comprises a first and second waveguide and the driving step comprises driving at least one waveguide by the encoded voltage data stream.

4. The method of claim 3, wherein the driving step further comprises driving both waveguides in an equal and opposite manner.

5. The method of claim 3, wherein the driving step further comprises splitting the encoded voltage data stream into a first and second stream, inverting one of the split voltage data streams and driving one waveguide with the first voltage data stream and driving the other waveguide with the second voltage data stream.

6. The method of claim 1, further comprising transmitting the optical output and converting the optical output into electrical signals.

7. A method of converting a non-return-to-zero (NRZ) voltage data stream into a return-to-zero optical data stream comprising:

supplying a continuous optical signal to a modulator, wherein the modulator has a minimum optical output at a first voltage driving level, a minimum optical output at a second voltage level, and a maximum optical output at a voltage level between the first and second voltage levels;

driving the modulator with an NRZ voltage data stream to generate an optical output such that there will be a maximum optical output when the voltage data stream transitions from the first to the second or from the second to the first voltage level;

converting the optical output of the modulator into electrical signals; and encoding the electrical signals.

8. The method of claim 7, wherein the encoding step comprises differentially encoding the electrical signals.

9. The method of claim 7, wherein the modulator comprises a first and second waveguide and the driving step comprises driving at least one waveguide by the NRZ voltage data stream.

10. The method of claim 9, wherein the driving step further comprises driving both waveguides in an equal and opposite manner.

11. The method of claim 9, wherein the driving step further comprises splitting the NRZ voltage data stream into a first and second stream, inverting one of the split data streams and driving one waveguide with the first data stream and driving the other waveguide with the second data stream.

12. The method of claim 7, further comprising transmitting the optical output to a receiver, which converts the optical output into electrical signals.

13. A method of converting a non-return-to-zero (NRZ) voltage data stream into a return-to-zero (RZ) optical data stream comprising:

supplying a continuous optical signal to a Mach-Zehnder interferometer;

encoding an NRZ data stream; and driving the modulator with the encoded NRZ voltage data stream to generate an RZ optical output.

14. A method of converting a non-return-to-zero (NRZ) voltage data stream into a return-to-zero optical data stream comprising:

supplying a continuous optical signal to a Mach-Zehnder interferometer;

driving the Mach-Zehnder interferometer with an NRZ voltage data stream to generate an RZ optical output;

converting the optical output to electrical signals; and encoding the electrical signals.

15. A method of converting a non-return-to-zero (NRZ) voltage data stream into a return-to-zero (RZ) optical data stream comprising:

supplying a continuous optical signal to a directional coupler;

encoding the NRZ data stream; and driving the directional coupler with the encoded NRZ voltage data stream to generate an RZ optical output.

16. A method of converting a non-return-to-zero (NRZ) voltage data stream into a return-to-zero (RZ) optical data stream comprising:

supplying a continuous optical signal to a directional coupler;

driving the directional coupler with an NRZ voltage data stream to generate an RZ optical output; and converting the optical output to electrical signals.

17. A method of converting a non-return-to-zero (NRZ) voltage data stream into a return-to-zero (RZ) data stream comprising:

supplying a continuous signal to a modulator, wherein the modulator has a minimum output at a first voltage driving level, a minimum output at a second voltage level, and a maximum output at a voltage level between the first and second voltage levels; and driving the modulator with the voltage data stream to generate an RZ data stream such that there will be a maximum output when the voltage data stream transitions from the first to the second or from the second to the first voltage level.

18. An apparatus for converting a non-return-to-zero (NRZ) voltage data stream into a return-to-zero (RZ) optical data stream comprising:

a source of a continuous optical signal;

a modulator having an input for receiving the optical signal and an output, wherein the modulator has a minimum optical output at a first voltage driving level, a minimum optical output at a second voltage driving level, and a maximum optical output at a voltage level between the first and second voltage levels;

a source of an NRZ voltage data stream; and an encoder having an input for receiving the NRZ data stream and an output for supplying an encoded NRZ voltage data stream to the modulator, wherein the NRZ voltage stream drives the modulator such that there will be a maximum output when the NRZ voltage data stream transitions from the first to the second or from the second to a first voltage level, generating an RZ optical output.

19. The apparatus or claim 18, wherein the encoder is a differential encoder.

20. The apparatus of claim 18, wherein the modulator comprises a first and second waveguide and the encoded NRZ voltage stream drives at least one of the waveguides.

21. The apparatus of claim 20, wherein the encoded NRZ voltage data stream is split into a first and second NRZ voltage data stream, the first data voltage stream driving the first waveguide and the second data voltage stream driving the second waveguide.

22. The apparatus of claim 21, further comprising an inverter which inverts either the first or the second NRZ voltage data streams.

23. The apparatus of claim 18, wherein the modulator is an interferometer.

24. The apparatus of claim 18, wherein the modulator is a Mach-Zehnder interferometer.

25. The apparatus of claim 18, wherein the modulator is a directional coupler.

26. An apparatus for converting a non-return-to-zero (NRZ) voltage data stream into a return-to-zero (RZ) optical data stream comprising:

a source of a continuous optical signal;

a modulator having an input for receiving the optical signal and an output, wherein the modulator has a minimum optical output at a first voltage driving level, a minimum optical output at a second voltage driving level, and a maximum optical output at a voltage level between the first and second voltage levels;

a source of an NRZ voltage data stream operatively connected to the modulator, wherein the NRZ voltage data stream drives the modulator such that there will be a maximum optical output when the voltage data stream transitions from the first to the second or from the second to the first voltage level;

a receiver having an input and an output, wherein the output of the modulator is connected to the input of the receiver; and an encoder connected to the output of the receiver, the encoder encoding the output of the receiver.

27. The apparatus of claim 26, wherein the encoder is a differential encoder.

28. The apparatus of claim 26, wherein the modulator comprises a first and second waveguide and the NRZ data stream drives at least one of the waveguides.

29. The apparatus of claim 28, wherein the NRZ data stream is split into a first and second NRZ data stream, the first data stream driving the first waveguide and the second data stream driving the second waveguide.

30. The apparatus of claim 29, further comprising an inverter which inverts either the first or the second data stream.

31. The apparatus of claim 26, wherein the modulator is an interferometer.

32. The apparatus of claim 26, wherein the modulator is a Mach-Zehnder interferometer.

33. The apparatus of claim 26, wherein the modulator is a directional coupler.

34. An apparatus for converting a non-return-to-zero (NRZ) voltage data stream into a return-to-zero (RZ) optical data stream comprising:

an interferometer;

an optical signal source which supplies a continuous signal to the interferometer;

a source of an NRZ voltage data stream;

an encoder having an input for receiving the NRZ data stream and an output providing an encoded NRZ voltage stream to drive the interferometer such that the output of the interferometer is an RZ optical data stream corresponding to the NRZ data stream.

35. The apparatus of claim 34, wherein the interferometer is a Mach-Zehnder interferometer.

36. An apparatus for converting a non-return-to-zero (NRZ) voltage data stream into a return-to-zero (RZ) optical data stream comprising:

an interferometer;

an optical signal source which supplies a continuous signal to the interferometer;

a source of an NRZ voltage data stream for driving the interferometer such that the output of the interferometer is an RZ optical data stream;

a receiver coupled to the output of the interferometer, the receiver converting the RZ optical data stream into voltage data stream; and an encoder having an input connected to an output of the receiver, the encoder retrieving the original NRZ data stream.

37. The apparatus of claim 36, wherein the interferometer is a Mach-Zehnder Interferometer.

38. An apparatus for converting a non-return-to-zero (NRZ) voltage data stream into a return-to-zero (RZ) optical data stream comprising:

a source of a continuous optical signal;

a directional coupler having an input for receiving the optical signal and an output;

a source of an NRZ voltage data stream;

an encoder having an input for receiving the NRZ data stream and an output for providing an encoded NRZ data stream to drive the directional coupler, such that the output of the coupler is an RZ optical data stream corresponding to the NRZ voltage data stream.

39. An apparatus for converting a non-return-to-zero (NRZ) voltage data stream into a return-to-zero (RZ) optical data stream comprising:

a source of a continuous optical signal;

a directional coupler having an input for receiving the optical signal and an output;

source of an NRZ voltage data stream for driving the directional coupler such that the output of the directional coupler is an RZ optical data stream;

a receiver coupled to the output of the coupler, the receiver converting the RZ optical data stream into a voltage data stream; and an encoder connected to the output of the receiver, the encoder retrieving the original NRZ voltage data stream.

40. An apparatus for converting a non-return-to-zero (NRZ) voltage data stream into a return-to-zero (RZ) optical data stream comprising:

a source of a continuous optical signal;

a modulator having an input for receiving the optical signal and an output, wherein the modulator has a minimum optical output at a first voltage driving level, a minimum optical output at a second voltage driving level, and a maximum optical output at a voltage level between the first and second voltage levels;

a source of an NRZ voltage data stream operatively connected to the modulator, the NRZ voltage data stream driving the modulator such that there will be a maximum output when the voltage data stream transitions from the first to the second or from the second to a first voltage level, generating an RZ optical data stream.

41. An apparatus for converting a non-return-to-zero (NRZ) voltage data stream into a return-to-zero (RZ) optical data stream comprising:

means for supplying a continuous optical signal to a modulator, wherein the modulator has a minimum optical output at a first voltage driving level, a minimum optical output at a second voltage level, and a maximum optical output at a voltage level between the first and second voltage levels;

means for encoding an NRZ voltage data stream; and means for driving the modulator with the encoded voltage stream to generate an RZ optical data stream such that there will be a maximum optical output when the voltage data stream transitions from the first to the second or from the second to the first voltage levels.

42. An apparatus for converting a non-return-to-zero (NRZ) voltage data stream into a return-to-zero (RZ) optical data stream comprising:

means for supplying a continuous optical signal to a modulator, wherein the modulator has a minimum optical output at a first voltage driving level, a minimum optical output at a second voltage level, and a maximum optical output at a voltage level between the first and second voltage levels;

means for driving the modulator with an NRZ voltage data stream to generate an optical output such that there will be a maximum optical output when the voltage data stream transitions from the first to the second or from the second to the first voltage levels;

means for converting the optical output of the modulator into electrical signals; and means for encoding the electrical signals.

* * * * *